UNITED STATES PATENT OFFICE.

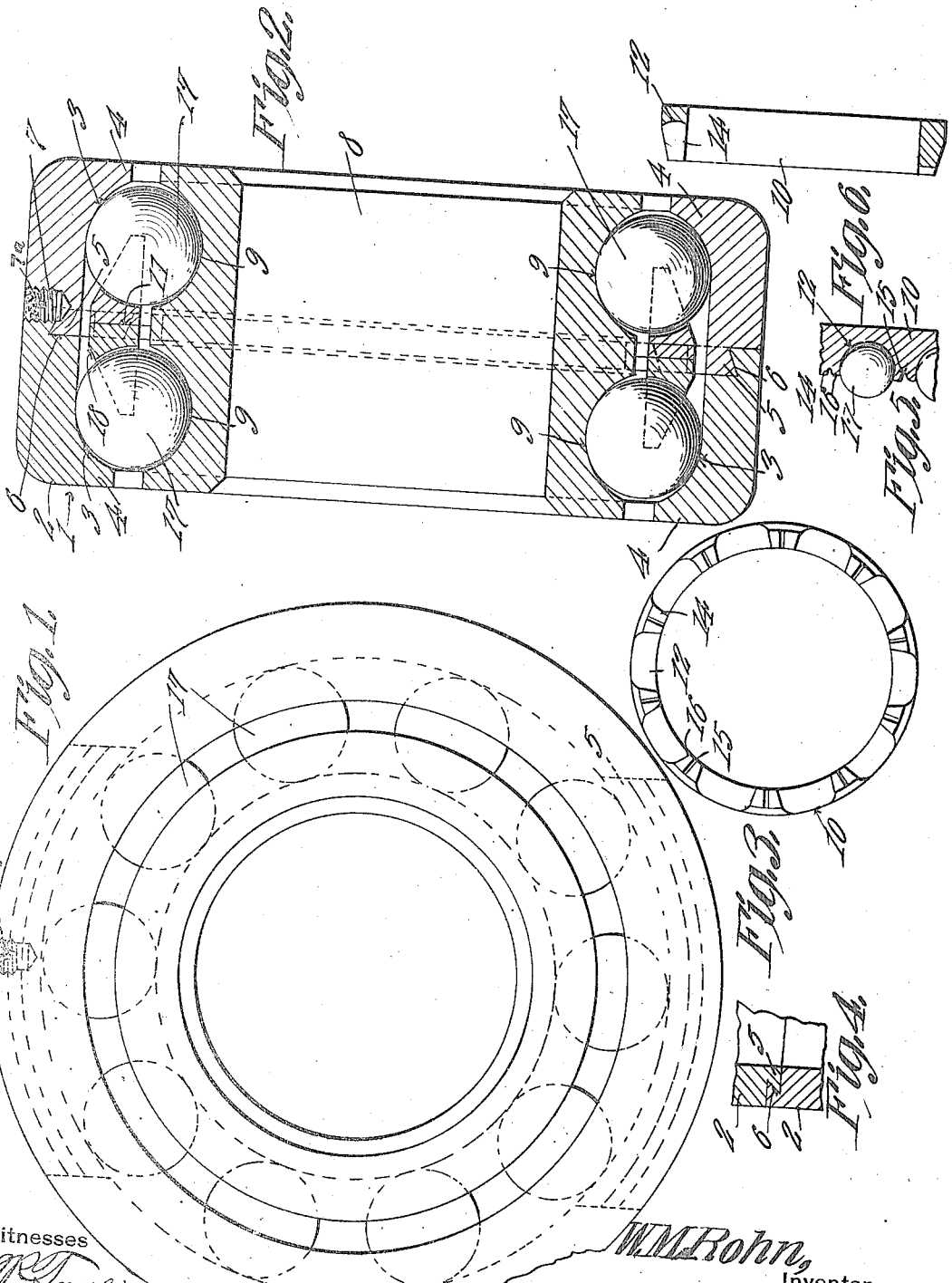

WILLIAM M. ROHN, OF DETROIT, MICHIGAN, ASSIGNOR TO EUREKA BALL BEARING COMPANY, OF ROCKFORD, ILLINOIS.

BALL BEARING AND RETAINER.

1,196,292.

Specification of Letters Patent.

Patented Aug. 29, 1916.

Application filed July 3, 1915. Serial No. 37,982.

*To all whom it may concern:*

Be it known that I, WILLIAM M. ROHN, a citizen of the United States, residing at Detroit, in the county of Wayne and State of Michigan, have invented a new and useful Ball Bearing and Retainer, of which the following is a specification.

The device forming the subject matter of this application is a bearing of that general type in which balls are located between a pair of inner and outer members.

The invention aims to provide novel means for operatively connecting the constituent elements of the outer member of the bearing, which outer member is a two-part structure.

Another object of the invention is to improve the construction of the ball retainer.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings: Figure 1 shows the invention in side elevation; Fig. 2 is a cross section; Fig. 3 is an elevation showing one of the rings which make up the ball retainer, the ring being in the position it will assume prior to the bending of the fingers thereof to coact with the balls; Fig. 4 is a fragmental sectional detail illustrating the means whereby the constituent elements of the outer member of the bearing are detachably connected; Fig. 5 is a fragmental plan showing the manner in which the fingers of the ball retainer coact with the balls to hold the same in place for rotation; Fig. 6 is a cross section showing one of the rings which make up the ball retaining means.

In carrying out the invention there is provided an annular outer member 1 which is a composite structure, the same comprising rings 2 located side by side and provided with ball races 3 defining inwardly projecting flanges 4. One of the outer members 1 is equipped with opposed, parti-circumferential ribs 5 which are dove-tailed in cross section, the ribs 5 being adapted to be received, upon relative rotation between the rings 2, in parti-circumferential grooves 6 formed in the other ring. The ribs and the grooves thus form interlocking elements which prevent a lateral separation of the rings 2. In order to prevent relative rotation between the rings 2 a set screw 7 is threaded into one of the rings and engages the rib 5 of the other ring. The screw 7 may be held in place by a mass of soft metal 7ª poured or beaten in the opening in which the screw is mounted. Disposed within the outer member 1 is an inner member 8 equipped with ball races 9. Balls 17 are interposed between the inner and outer members and coöperate with the ball races 3 and 9. Disposed between the inner and outer members is a ball retaining means preferably in the form of rings 10, the adjacent faces of which abut as shown at 11. In the lateral edges of the rings 10 are formed ball receiving seats 12 defining lugs 14 having notches 15 in their ends, forming fingers 16 which are flexed in opposite directions, circumferentially, to coact with the balls. The rings 10 which make up the ball retaining means preferably are fashioned from some metal which will permit the bending of the fingers 16 to coact with the balls 17, the fingers extending slightly beyond the median planes of the balls, as will be evident from Fig. 2. In Fig. 2 at 18, the constituent rings 10 of the ball retaining means are shown beveled, so that the fingers 16 are of tapered form, reference being had to Fig. 2. Thus, the fingers will coact properly with the balls when the fingers are bent.

Having thus described the invention, what is claimed is:—

In a device of the class described, coöperating parts comprising an inner member and an outer member, one of which members includes a pair of rings located side by side, one ring being provided with a parti-circumferential dove-tailed rib and the other ring being provided with a parti-circumferential dove-tailed recess adapted to receive the rib upon relative movement between the rings, thereby to prevent a lateral separation of the rings; a set screw threaded into the recess carrying ring and engaging the rib; balls located between the inner and outer members; and an annular ball retaining means located between the inner and outer members, the lateral edges of the ball retaining means being provided with spaced ball receiving seats defining lugs, the lugs having V-shaped notches at their outer ends and spaced equally from the seats, the notches defining bendable fingers which are adapted to be circumferentially flexed simultaneously in opposite directions by a single manipulation of a tool inserted into the notch, to form retaining elements for the balls, the ball retaining means being beveled adjacent its edges to taper the fingers.

In testimony that I claim the foregoing as my own, I have hereto affixed my signature in the presence of two witnesses.

WILLIAM M. ROHN.

Witnesses:
ANNE L. ANDERSON,
EDWARD M. MUELLER.